(12) United States Patent
Beard et al.

(10) Patent No.: US 10,146,022 B1
(45) Date of Patent: Dec. 4, 2018

(54) POE ELECTRICAL/OPTICAL DATA SIGNAL CONVERTER SYSTEM

(71) Applicant: Dell Products L.P., Round Rock, TX (US)

(72) Inventors: Robert Neal Beard, Austin, TX (US); Victor Barrett Teeter, Round Rock, TX (US); Andrew Blake Berry, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/711,829

(22) Filed: Sep. 21, 2017

(51) Int. Cl.
| | |
|---|---|
| G02F 1/35 | (2006.01) |
| G02B 6/42 | (2006.01) |
| H04B 10/25 | (2013.01) |
| H04B 10/27 | (2013.01) |
| H04B 10/40 | (2013.01) |
| H04N 7/173 | (2011.01) |
| H04N 7/22 | (2006.01) |
| H04L 12/66 | (2006.01) |
| H04N 21/61 | (2011.01) |
| G02F 2/02 | (2006.01) |

(52) U.S. Cl.
CPC ......... G02B 6/4293 (2013.01); G02B 6/4284 (2013.01); H04B 10/25 (2013.01); H04B 10/27 (2013.01); H04B 10/40 (2013.01); H04L 12/66 (2013.01); H04N 7/17309 (2013.01); H04N 7/22 (2013.01); H04N 21/615 (2013.01)

(58) Field of Classification Search
None
See application file for complete search history.

(56) References Cited

U.S. PATENT DOCUMENTS

| | | | | |
|---|---|---|---|---|
| 7,441,133 B2* | 10/2008 | Giat | ................ | H04L 12/10 |
| | | | | 713/300 |
| 7,549,067 B2* | 6/2009 | Tolliver | ................ | G06F 1/266 |
| | | | | 713/320 |
| 9,052,482 B1* | 6/2015 | Siddhaye | ............ | G02B 6/4293 |
| | | (Continued) | | |

OTHER PUBLICATIONS

"Study Examines North American Copper and Fiber Cabling Market Through 2018," Cabling Installation & Maintenance, May 30, 2014, 2 Pages, http://www.cablinginstall.com/articles/2014/05/ins-cabling-market-study.html.

*Primary Examiner* — Rhonda S Peace
(74) *Attorney, Agent, or Firm* — Haynes and Boone, LLP

(57) ABSTRACT

An electrical/optical signal conversion system includes a PoE powering device with powering device electrical data ports, and a PoE powered device (PD) with a power controller coupled to PoE-powered signal conversion subsystems that each include an electrical/optical signal converter coupled to a PD electrical data port and a PD optical data port. The PD electrical data ports receive power and electrical data signals transmitted by a powering device electrical data port, transmit the electrical data signals to their electrical/optical signal converter, and provide the power to the power controller. The corresponding PD optical data port then receives power from the power controller that was provided by the PD electrical data port, receives optical data signals from the electrical/optical signal converter that were converted from the electrical data signals transmitted by the PD electrical data port, and transmits the optical data signals to a first optical signal device.

20 Claims, 11 Drawing Sheets

(56) References Cited

U.S. PATENT DOCUMENTS

| | | | |
|---|---|---|---|
| 9,247,318 B2* | 1/2016 | Teeter | H04Q 1/09 |
| 9,690,343 B2* | 6/2017 | Teeter | G06F 1/266 |
| 9,755,852 B2* | 9/2017 | Fischer | H04L 12/413 |
| 9,882,656 B2* | 1/2018 | Sipes, Jr. | H04B 10/808 |
| 2009/0235096 A1* | 9/2009 | Thomas | H04L 12/10 |
| | | | 713/310 |
| 2014/0293994 A1* | 10/2014 | Pepe | G02B 6/4284 |
| | | | 370/352 |
| 2016/0020858 A1* | 1/2016 | Sipes, Jr. | H04B 10/808 |
| | | | 398/45 |
| 2016/0020911 A1* | 1/2016 | Sipes, Jr. | H04B 10/808 |
| | | | 398/16 |

* cited by examiner

POE ELECTRICAL/OPTICAL DATA SIGNAL CONVERTER SYSTEM

BACKGROUND

The present disclosure relates generally to information handling systems, and more particularly to a Power over Ethernet (PoE) powered system for converting between electrical data signals and optical data signals used by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, server devices, and storage devices, sometimes utilize different types of communication signals. For example, some devices may communicate via Ethernet electrical data signals that are transmitted over copper wire cabling (e.g., via copper Base-T RJ45 ports), while other device may communicate via Ethernet optical data signals that are transmitted over optical fiber cabling (e.g., via optical Small Form-factor Pluggable (SFP) ports or optical Network Interface Controller (NIC) ports.) Optical fiber cabling is a newer technology than copper wire cabling, but is becoming increasingly popular and currently accounts for approximately one third of the cabling in 2017, a percentage that is expected to grow in the future. However, conventional signal converter systems are bulky, often blocking adjacent ports (i.e., ports adjacent to the port that they are connected to), and require a connection to large power adapters (e.g., 120 volt "bricks") that must be plugged into a power source in order to provide for the conversion of communication signals.

As such, users are prevented or limited in their ability to 1) connect a switch device with only copper Base-T RJ45 ports to another device with only optical SFP ports, 2) connect a switch device with predominantly copper Base-T RJ45 ports and only limited optical SFP ports (which are already being used) to another device with only optical SFP ports, 3) connect a switch device with only copper Base-T RJ45 ports to a server device or storage device with only optical NIC ports, 4) migrate data between devices with only copper Base-T RJ45 ports and devices with only optical SFP ports or optical NIC ports, 5) connect an optical patch panel with only optical SFP ports or optical NIC ports to devices with only copper Base-T RJ45 ports, 6) utilize cables longer than what is supported by Base-T (e.g., approximately 100 meters) when their devices utilize only copper Base-T RJ45 ports, and 7) utilize optical communications for a firmware test bed when their devices utilize only copper Base-T RJ45 ports. These limitations created by conventional signal converter systems result in customer frustration, design issues, costs associated with the need to purchase additional equipment, forced premature upgrades, issues with data logistics, wasted time, and difficulties in phasing new products into a network.

Accordingly, it would be desirable to provide an improved signal converter system.

SUMMARY

According to one embodiment, an Information Handling System (IHS) includes a power controller; and a first Power over Ethernet (PoE)-powered signal conversion subsystem including: a first electrical/optical signal converter; a first powered device Ethernet-electrical data port that coupled to the first electrical/optical signal converter and that is configured to: receive first Ethernet-electrical data signals transmitted by a first powering device Ethernet-electrical data port on a PoE powering device and transmit the first Ethernet-electrical data signals to the first electrical/optical signal converter; and receive power transmitted by the first powering device Ethernet-electrical data port on the PoE powering device and provide the power to the power controller; and a first powered device Ethernet-optical data port that coupled to the first electrical/optical signal converter and that is configured to: receive power from the power controller that was provided by the first powered device Ethernet-electrical data port; receive first Ethernet-optical data signals from the first electrical/optical signal converter that were converted by the first electrical/optical signal converter from the first Ethernet-electrical data signals transmitted by the first powered device Ethernet-electrical data port; and transmit the first Ethernet-optical data signals to a first optical signal device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
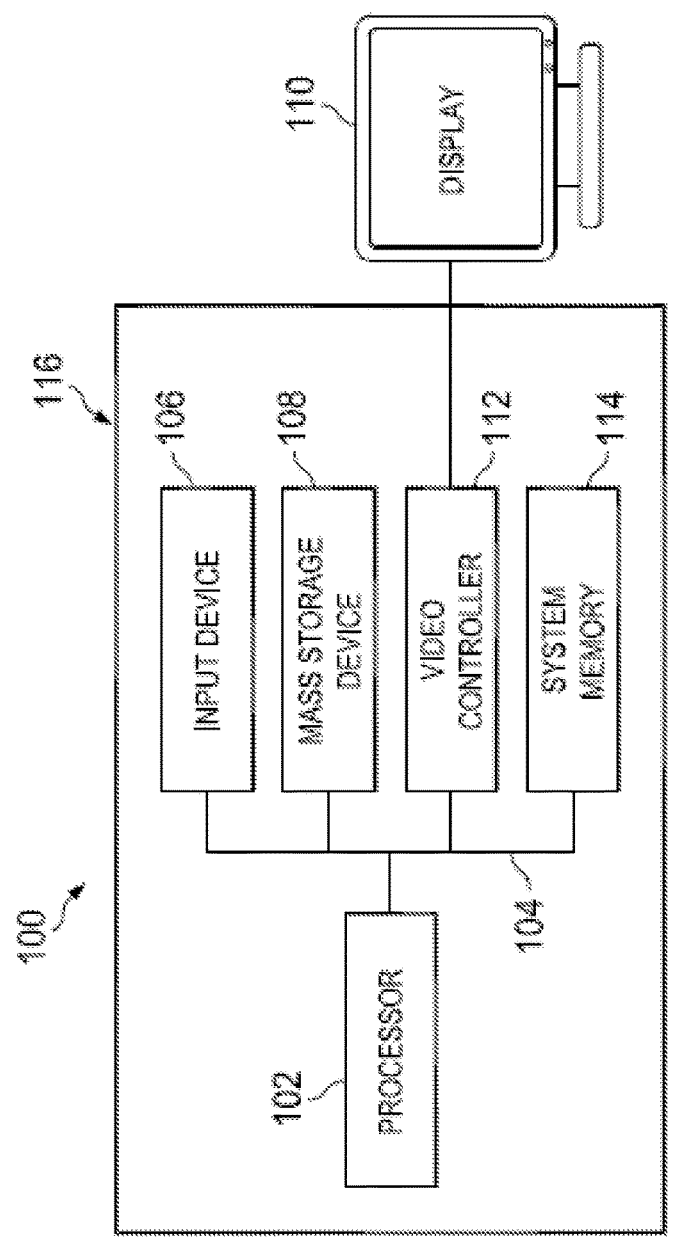
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
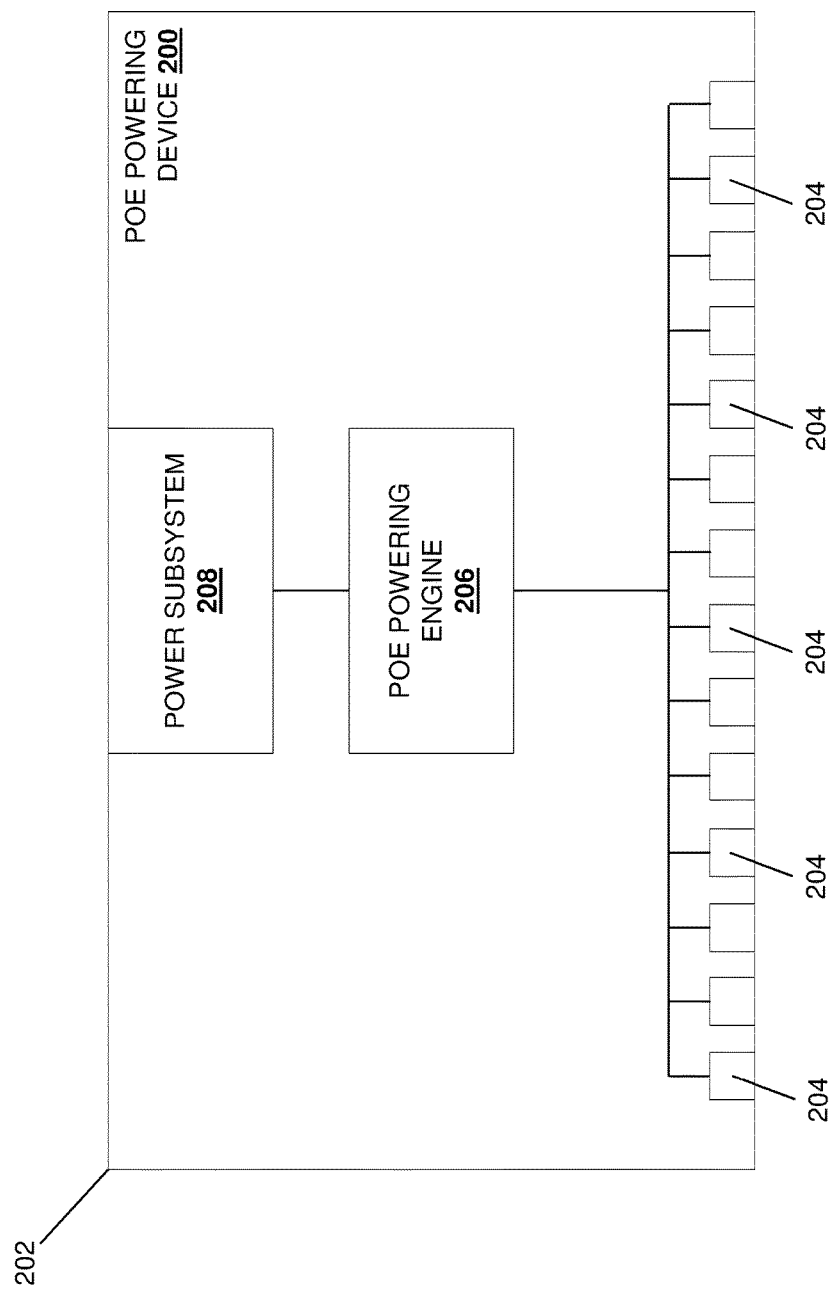
FIG. 2 is a schematic view illustrating an embodiment of a Power over Ethernet (PoE) powering device.

Referring now to FIG. 2, an embodiment of a Power over Ethernet (PoE) powering device 200 is illustrated. In an embodiment, the PoE powering device 200 may be the IHS 100 discussed above with reference to FIG. 1, and/or may include some or all of the components of the IHS 100. In the examples discussed below, the PoE powering device 200 is described as a Power Sourcing Equipment (PSE) switch device, but one of skill in the art in possession of the present disclosure will recognize that other types of PoE-enabled computing devices (e.g., servers, etc.), PoE-enabled storage devices, and/or other PoE powering devices will fall within the present disclosure as well. In the illustrated embodiment, the PoE powering device 200 includes a chassis 202 that houses the components of the PoE powering device 200, only some of which are illustrated in FIG. 2. As discussed below, while not illustrated, the chassis 202 may include a variety of features for coupling and/or securing the PoE powering device 200 to a rack. The chassis 202 includes a plurality of electrical data ports 204 that, in the discussions below, are provided by Ethernet-electrical data ports such as, for example, copper Base-T RJ45 data ports. However, in other embodiments, different types of electrical data ports will benefit from the teachings of the present disclosure and thus fall within its scope as well. As discussed below at least a subset of the electrical data ports 204 are PoE-enabled electrical data ports that are configured to transmit electric power along with data via Ethernet cabling (e.g., twisted pair Ethernet cables) as per PoE, PoE+, and Universal PoE (UPoE) standards or systems (collectively referred to as "PoE" herein). As such, the electrical data ports 204 may include or be coupled to classification circuitry and/or any of a variety of PoE port components known in the art.

The chassis 202 may also house a processing system (not illustrated, but which may include the processor 102 discussed above with reference to FIG. 1) and a memory system (not illustrated, but which may include the system memory 114 discussed above with reference to FIG. 1) that is coupled to the processing system and that include instructions that, when executed by the processing system, cause the processing system to provide a PoE powering engine 206 that is configured to perform the functionality described below for the PoE powering engines and PoE powering devices. As such, the PoE powering engine may be configured to perform PoE powered device classification, PoE powered device power distribution, and/or any other PoE functionality that would be apparent to one of skill in the art in possession of the present disclosure. The PoE powering engine 206 is coupled to each of the electrical data ports 204 (e.g., via a coupling between the processing system and the electrical data ports 204.) The chassis 202 may also house a power subsystem 208 that is coupled to the PoE powering engine 206 (e.g., via a coupling between the processing system and one or more components of the powering subsystem 208.) In an embodiment, the powering subsystem 208 may include a power supply unit, a power adapter, a power cord, and/or any other power subsystem components that would be apparent to one of skill in the art in possession of the present disclosure. While a specific PoE powering device 200 has been illustrated and described, one of skill in the art in possession of the present disclosure will recognize that the PoE powering device 200 may include a variety of other components and/or component configurations that provide for conventional functionality (e.g., switching functionality), as well as the functionality discussed below, while remaining within the scope of the present disclosure.

Figure 3A:
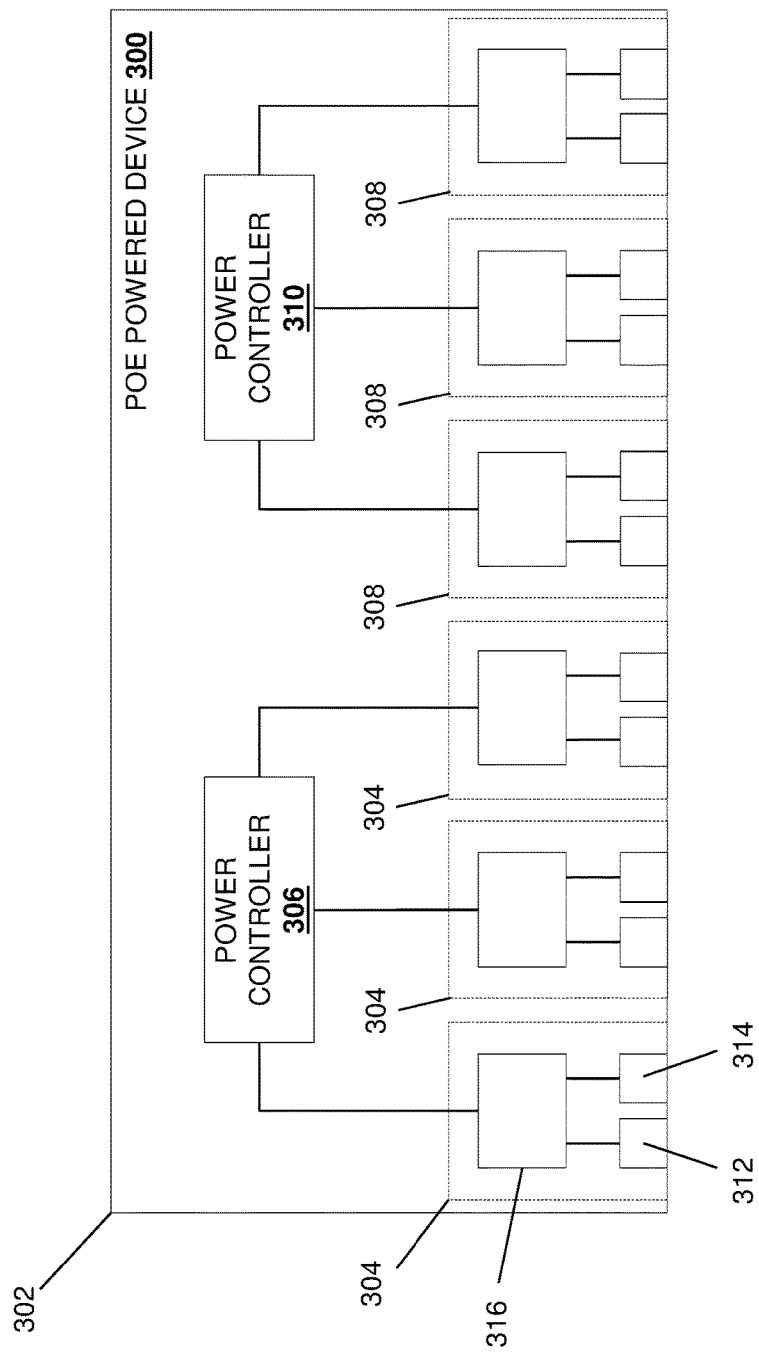
FIG. 3A is a schematic view illustrating an embodiment of a PoE powered device.
Figure 3B:
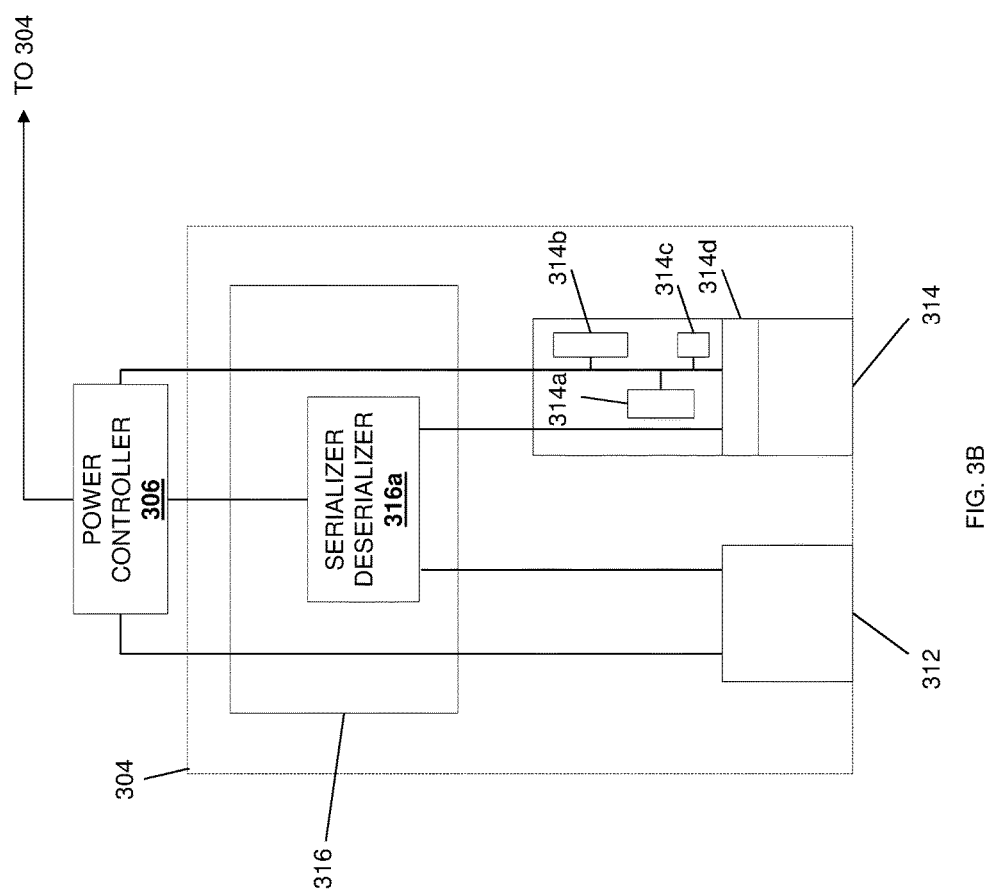
FIG. 3B is a schematic view illustrating an embodiment of a PoE-powered data signal conversion subsystem in the PoE powered device of FIG. 3A.

Referring now to FIGS. 3A and 3B, an embodiment of a PoE powered device 300 is illustrated. In an embodiment, the PoE powered device 300 may be the IHS 100 discussed above with reference to FIG. 1, and/or may include some or all of the components of the IHS 100. In the examples discussed below, the PoE powered device 300 is described as a dedicated, PoE-enabled, multi-port electrical/optical signal converter appliance, but one of skill in the art in possession of the present disclosure will recognize that the components and functionality the PoE powered device 300 device may be incorporated into a variety of devices while remaining within the present disclosure as well. In the illustrated embodiment, the PoE powered device 300 includes a chassis 302 that houses the components of the PoE powered device 300, only some of which are illustrated in FIGS. 3A and 3B. As discussed below, while not illustrated, the chassis 302 may include a variety of features for coupling and/or securing the PoE powered device 300 to a rack. In the example illustrated in FIG. 3A, the chassis 302 includes a plurality of PoE-powered data signal conversion subsystems 304 that are coupled to a power controller 306, and a plurality of PoE-powered data signal conversion subsystems 308 that are coupled to a power controller 310. In an embodiment, the power controllers 306 and 310 may be considered part of a power plane that is shared by subsets of the PoE-powered data signal conversion subsystems 304. While the illustrated embodiments include three PoE-powered data signal conversion subsystems coupled to each power controller, more or fewer PoE-powered data signal conversion subsystems may be coupled to more or fewer power controllers while remaining within the scope of the present disclosure. Specifically, while three PoE-powered data signal conversion subsystems are coupled to each power controller, UPoE or subsequent standards/systems may enable sixteen or more PoE-powered data signal conversion subsystems to be coupled to each power controller.

With reference to FIG. 3B, an embodiment of one of the PoE-powered data signal conversion subsystem 304 is illustrated, and one of skill in the art in possession of the present disclosure will appreciate that the PoE-powered data signal conversion subsystem 304 described with reference to FIG. 3B may be any of the PoE-powered data signal conversion subsystems 304 and/or 308 while remaining within the scope of the present disclosure. The PoE-powered data signal conversion subsystem 304 includes an electrical data port 312 that, in the embodiments discussed below, may be provided by Ethernet-electrical data ports such as, for example, copper Base-T RJ45 data ports. However, in other embodiments, different types of electrical data ports will benefit from the teachings of the present disclosure and thus fall within its scope as well. As discussed below at least a subset of the electrical data ports 312 are PoE-enabled electrical data ports that are configured to receive electric power along with data via Ethernet cabling (e.g., twisted pair Ethernet cables) as per PoE, PoE+, and Universal PoE (UPoE) standards or systems (collectively referred to as "PoE" herein). As such, the electrical data ports 312 may include or be coupled to classification circuitry and/or any of a variety of PoE port components known in the art.

The PoE-powered signal conversion subsystem 304 also includes an optical data port 314 that, in the embodiments discussed below, may be provided by Ethernet-optical data ports such as, for example, optical SFP data ports. However, in other embodiments, different types of optical data ports will benefit from the teachings of the present disclosure and thus fall within its scope as well. In the illustrated embodiment, the optical data port includes a variety of optical data port components 314a, 314b, 314c, and 314d, which may include Electrically Erasable Programmable Read Only Memory (EEPROM), controllers, LASER drivers, external transmitter/receiver (TX/RX) physical connection points, and/or a variety of other optical data port components known in the art. Each of the electrical data port 312 and the optical data port 314 in the PoE-powered signal conversion subsystem 304 is coupled to an electrical/optical data signal converter 316 that, in the embodiment illustrated in FIG. 3B, includes a serializer/deserializer (SerDes) 316a that is configured to convert an analog electrical data signals into a digital optical data signal/or perform a variety of other electrical/optical data signal conversion functionality that would be apparent to one of skill in the art in possession of the present disclosure. As can be seen in FIG. 3B, the power controller 306 is coupled to the electrical data port 312, the electrical/optical data signal converter 316 (e.g., the serializer/deserializer 316a), and the optical data port 314 (e.g., the optical data port components 314a-d), and as discussed below is configured to receive power transmitted through the electrical data port 314, and provide that power to the electrical/optical data signal converter 316 (e.g., the serializer/deserializer 316a) and the optical data port 314 (e.g., the optical data port components 314a-d).

While a specific embodiment of a PoE powered device 300 has been described, one of skill in the art in possession of the present disclosure will recognize that the PoE powered device 300 may include other components and/or component configurations that perform conventional functionality, as well as the functionality discussed below, while remaining within the scope of the present disclosure. For example, in some embodiments, the PoE powered device 300 may be provided as a single PoE-powered signal conversion subsystem 304 in a transceiver chassis (i.e., the chassis 302), with the electrical data port 312 provided as a male Ethernet-electrical data connector that is configured to mate with an Ethernet-electrical data port 204 on the PoE powering device 200, and the Ethernet-optical data port 314 utilized substantially as described below. In such embodiments, the power controllers may be omitted, and the single PoE-powered signal conversion subsystem 304 may be powered via power received through the male Ethernet-electrical data connector, similarly as discussed below.

Figure 4:
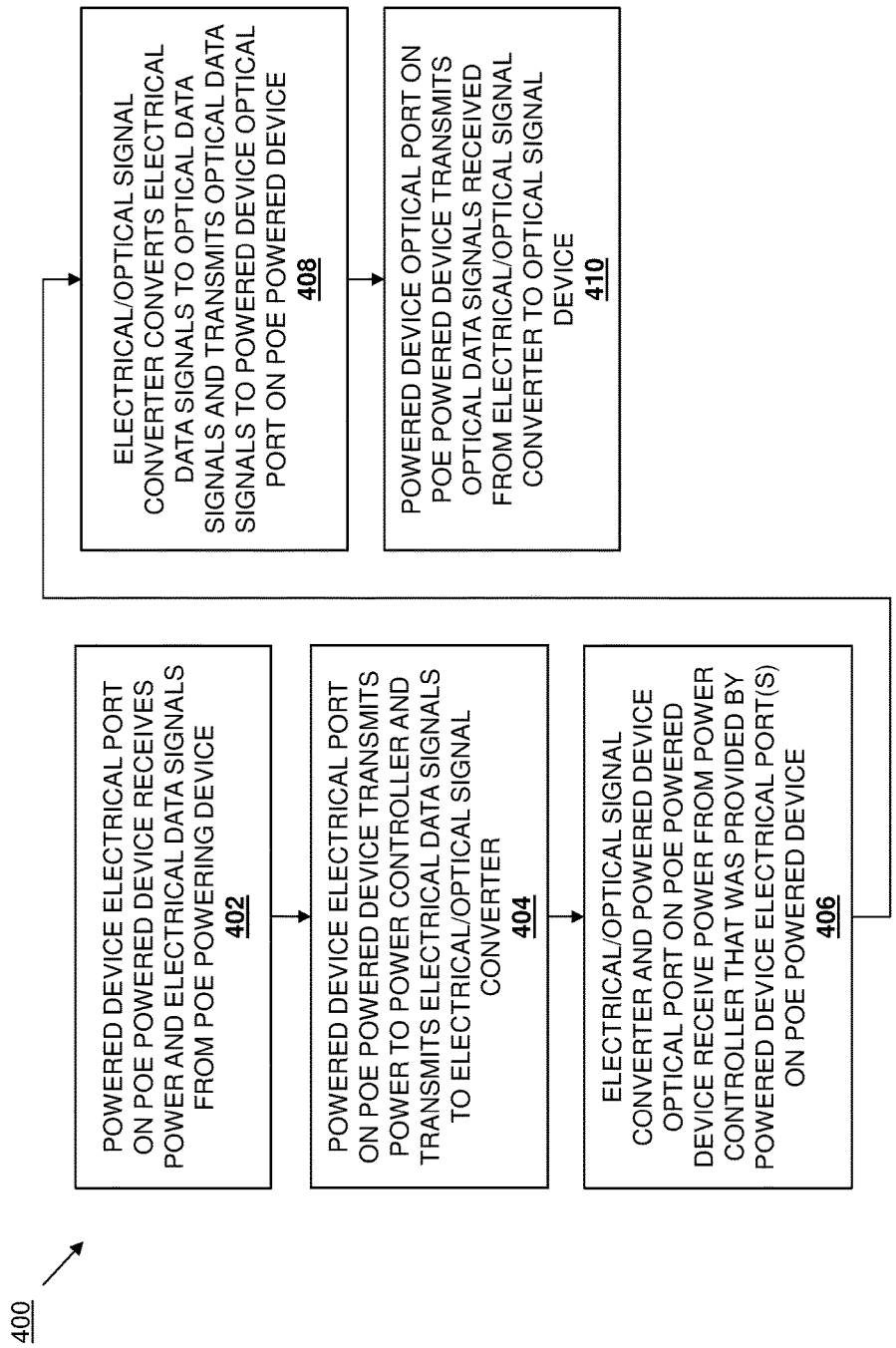
FIG. 4 is a flow chart illustrating an embodiment of a method for providing PoE-powered electrical/optical signal conversion.

Referring now to FIG. 4, an embodiment of a method 400 for providing PoE-powered electrical/optical data signal conversion is illustrated. As discussed below, embodiments of the systems and methods of the present disclosure provide a powered PoE device that powers electrical/optical data signal conversion subsystems via PoE power received at electrical data ports. Each of the electrical/optical data signal conversion subsystems includes an electrical/optical data signal converter that is powered via the PoE power and configure to convert electrical data signals received at an electrical data port on that electrical/optical signal conversion subsystem to optical data signals that are then transmitted through an optical data port on that electrical/optical signal conversion subsystem that is also powered via the PoE power. Similarly, the electrical/optical data signal converter that is powered via the PoE power is also configured to convert optical data signals received at the optical data port on that electrical/optical data signal conversion subsystem to electrical data signals that are then transmitted through the electrical data port on that electrical/optical data signal conversion subsystem. In some embodiments, only subsets of the electrical/optical data signal conversion subsystems include an electrical data port that receives PoE power that is utilized by the PoE device, and the PoE power received via the electrical data ports on those electrical/optical data signal conversion subsystems may be utilized to power electrical/optical data signal conversion subsystems that include electrical data port that do not receive PoE power. As such, the ability to connect devices that communicate via electrical data signals to devices that communicate via optical data signals is greatly enhanced by simply using conventional cabling to connect those devices to the electrical/optical data signal conversion subsystems, thus eliminating the issues associated with adjacent port blocking and the need for power adapters discussed above.

Figure 5A:
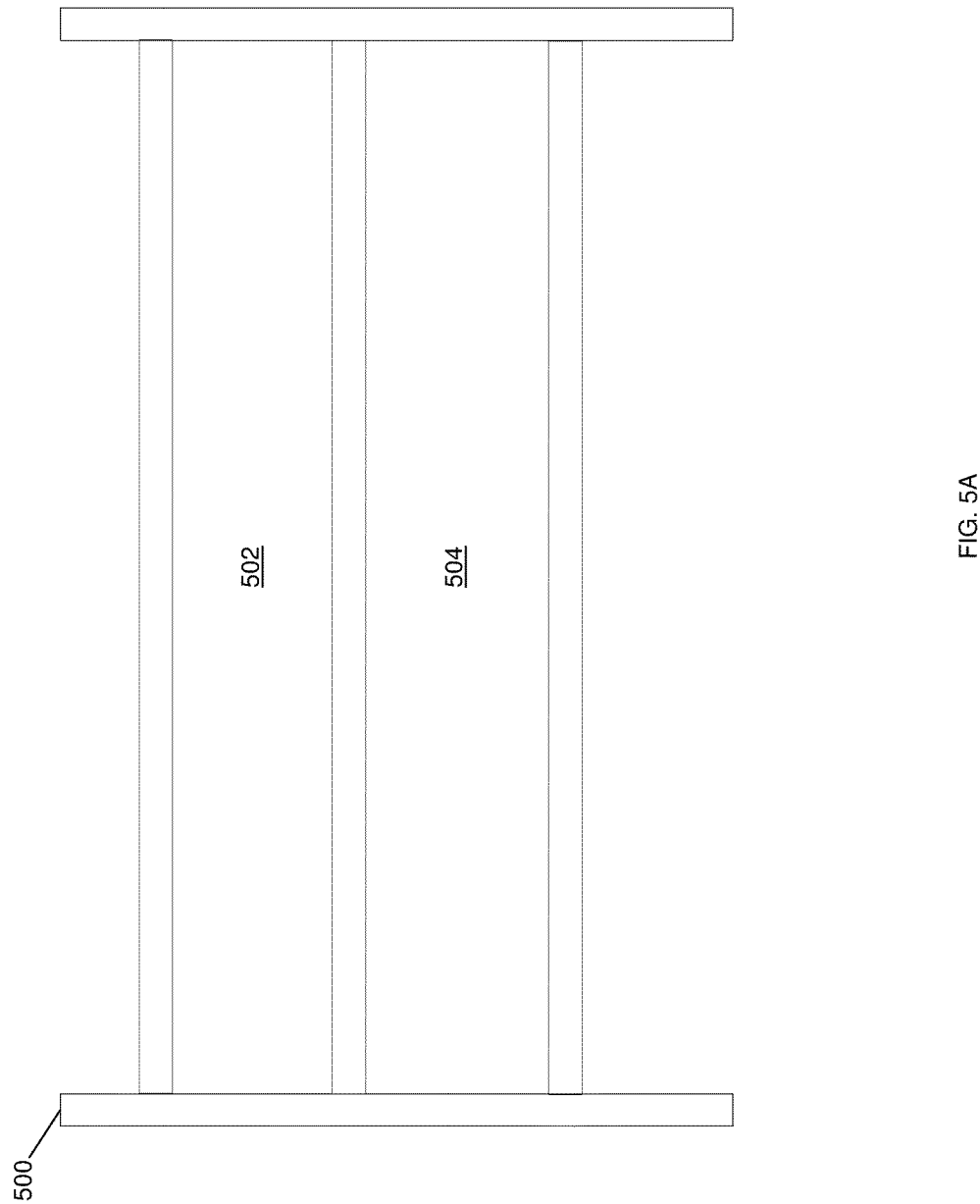
FIG. 5A is a front view illustrating an embodiment of a rack.
Figure 5B:
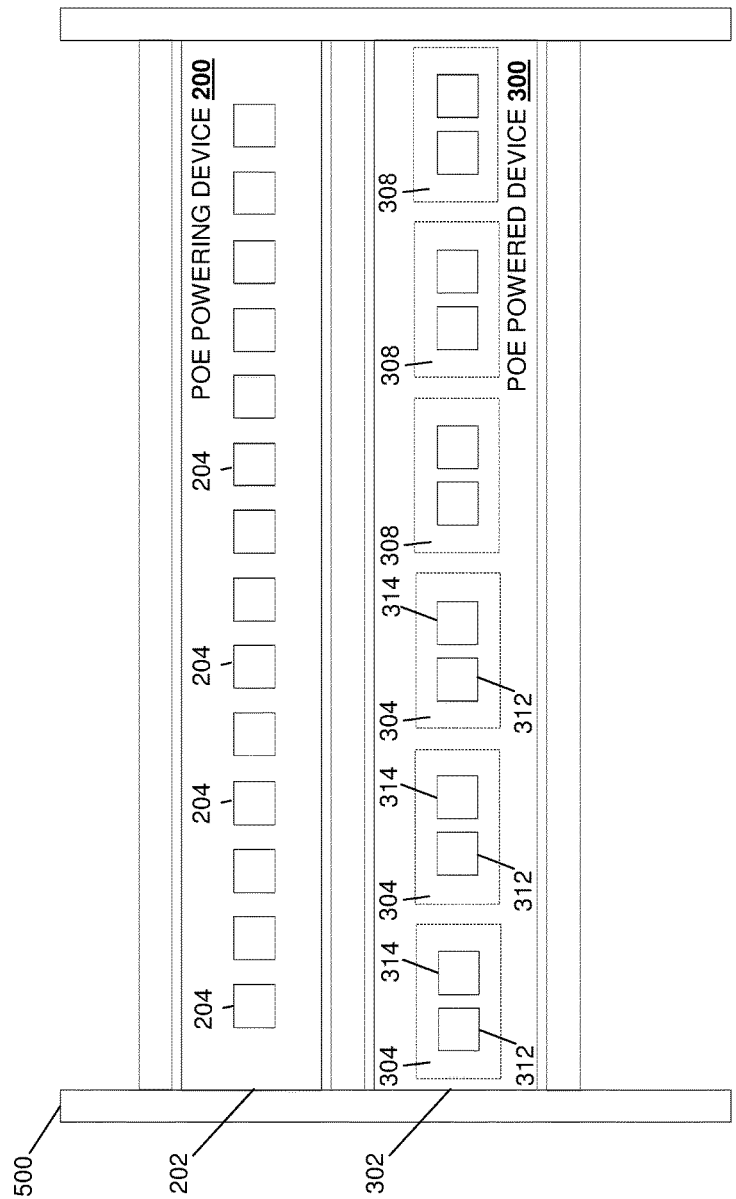
FIG. 5B is a front view illustrating an embodiment of the PoE powering device of FIG. 2 and the PoE powered device of FIGS. 3A and 3B positioned in the rack of FIG. 5A.

The method 400 begins at block 402 where a powered device electrical data port on a PoE powered device receives power and electrical data signals from a PoE powering device. In some embodiments, prior to and/or at block 402, the PoE powering device 200 and the PoE powered device 300 may be coupled to a rack. For example, FIG. 5A illustrates a rack 500 that defines a plurality of device slots 502 and 504. In a specific example, the rack 500 may be a 42 rack unit (U) rack, with each of the device slots measuring 1 U in height. While not explicitly illustrated, the rack 500 may include a variety of coupling and/or securing features (e.g., channels, tracks, latches, locks, etc.) that are located adjacent each of the device slots 502 and 504, and that are configured to engage devices to couple and/or secure those devices to the rack 500. Thus, as illustrated in FIG. 5B, the PoE powering device 200 may be positioned adjacent the device slot 502 and then moved into the device slot 502 such that features on the chassis 202 engage the coupling and/or securing feature on the rack 500 in order to couple and/or secure the PoE powering device 200 to the rack 500. Similarly, as also illustrated in FIG. 5B, the PoE powered device 300 may be positioned adjacent the device slot 504 and then moved into the device slot 504 such that features on the chassis 302 engage the coupling and/or securing feature on the rack 500 in order to couple and/or secure the PoE powered device 300 to the rack 500. Thus, in some embodiments, the chassis 302 of the PoE powered device 300 may be dimensioned to allow for the positioning of the PoE powered device 300 adjacent the PoE powering device 200 in a rack, although differently dimensioned chassis will fall within the scope of the present disclosure as well. While not illustrated, the power subsystem 208 on the PoE powering device 200 may be connected to a power source (e.g., an AC power subsystem) once the PoE powering device 200 is positioned in the rack 500.

Figure 5C:
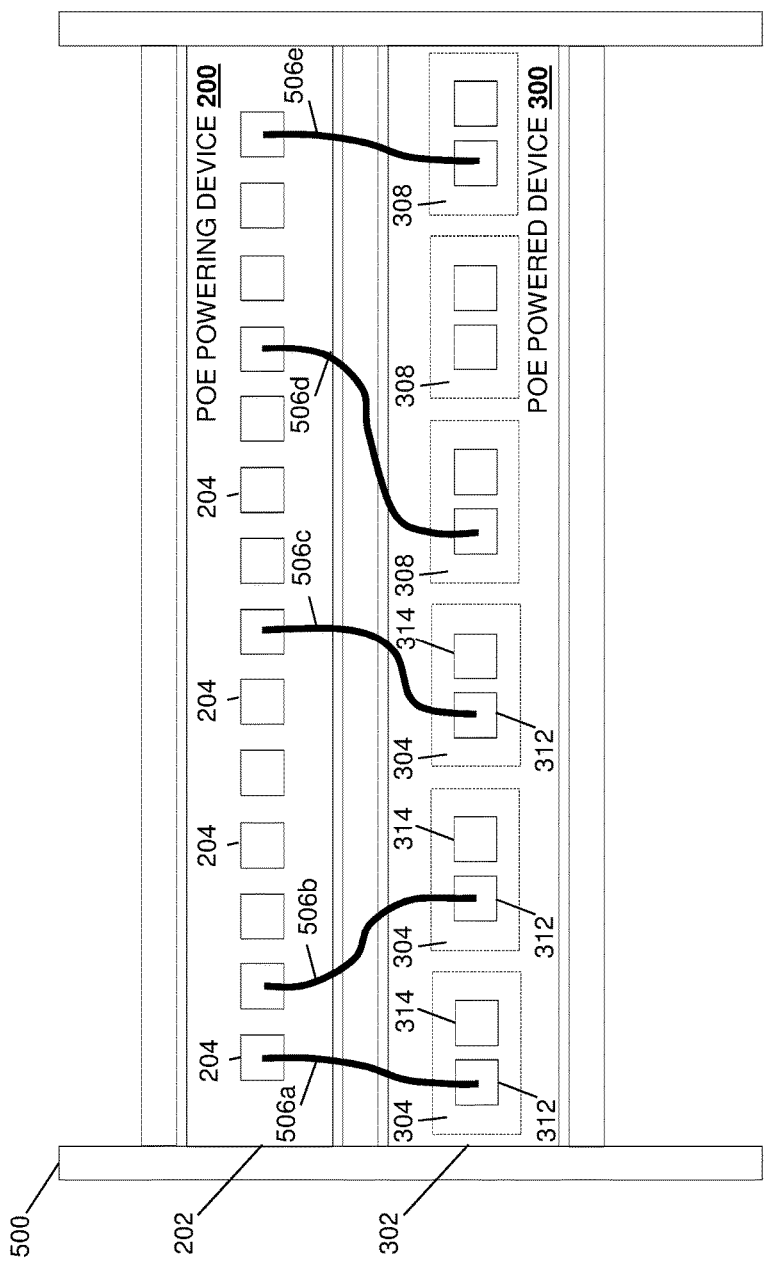
FIG. 5C is a front view illustrating an embodiment of electrical data ports on the PoE device of FIG. 2 connected to the PoE-powered data signal conversion subsystems in the PoE powered device of FIGS. 3A and 3B.

Referring now to FIG. 5C, each of a subset of the electrical data ports 204 on the PoE powering device 200 are illustrated as coupled to respective electrical data ports 312 on the PoE-powered signal conversion subsystems 304 included on the PoE powered device 300. For example, an Ethernet-electrical Base-T RJ45 cable 506a may be provided to connect an Ethernet-electrical Base-T RJ45 port 204 on the PoE powering device 200 to an Ethernet-electrical Base-T RJ45 port 312 in an Ethernet-electrical/Ethernet-optical data signal conversion subsystem 304 on the PoE powered device 300; an Ethernet-electrical Base-T RJ45 cable 506b may be provided to connect an Ethernet-electrical Base-T RJ45 port 204 on the PoE powering device 200 to an Ethernet-electrical Base-T RJ45 port 312 in an Ethernet-electrical/Ethernet-optical data signal conversion subsystem 304 on the PoE powered device 300; an Ethernet-electrical Base-T RJ45 cable 506c may be provided to connect an Ethernet-electrical Base-T RJ45 port 204 on the PoE powering device 200 to an Ethernet-electrical Base-T RJ45 port 312 in an Ethernet-electrical/Ethernet-optical data signal conversion subsystem 304 on the PoE powered device 300; an Ethernet-electrical Base-T RJ45 cable 506d may be provided to connect an Ethernet-electrical Base-T RJ45 port 204 on the PoE powering device 200 to an Ethernet-electrical Base-T RJ45 port 312 in an Ethernet-electrical/Ethernet-optical data signal conversion subsystem 308 on the PoE powered device 300; and an Ethernet-electrical Base-T RJ45 cable 506e may be provided to connect an Ethernet-electrical Base-T RJ45 port 204 on the PoE powering device 200 to an Ethernet-electrical Base-T RJ45 port 312 in an Ethernet-electrical/Ethernet-optical data signal conversion subsystem 308 on the PoE powered device 300. As would be understood by one of skill in the art in possession of the present disclosure, the connection of PoE-enabled electrical data ports 204 on the PoE powering device 200 to respective PoE-enabled electrical data ports 312 on the PoE powered device 300 may be followed by a PoE classification process in which the PoE powering engine 206 and/or electrical data ports 204 are utilized to determine an amount of power to provide to their connected electrical data ports 312.

Figure 5D:
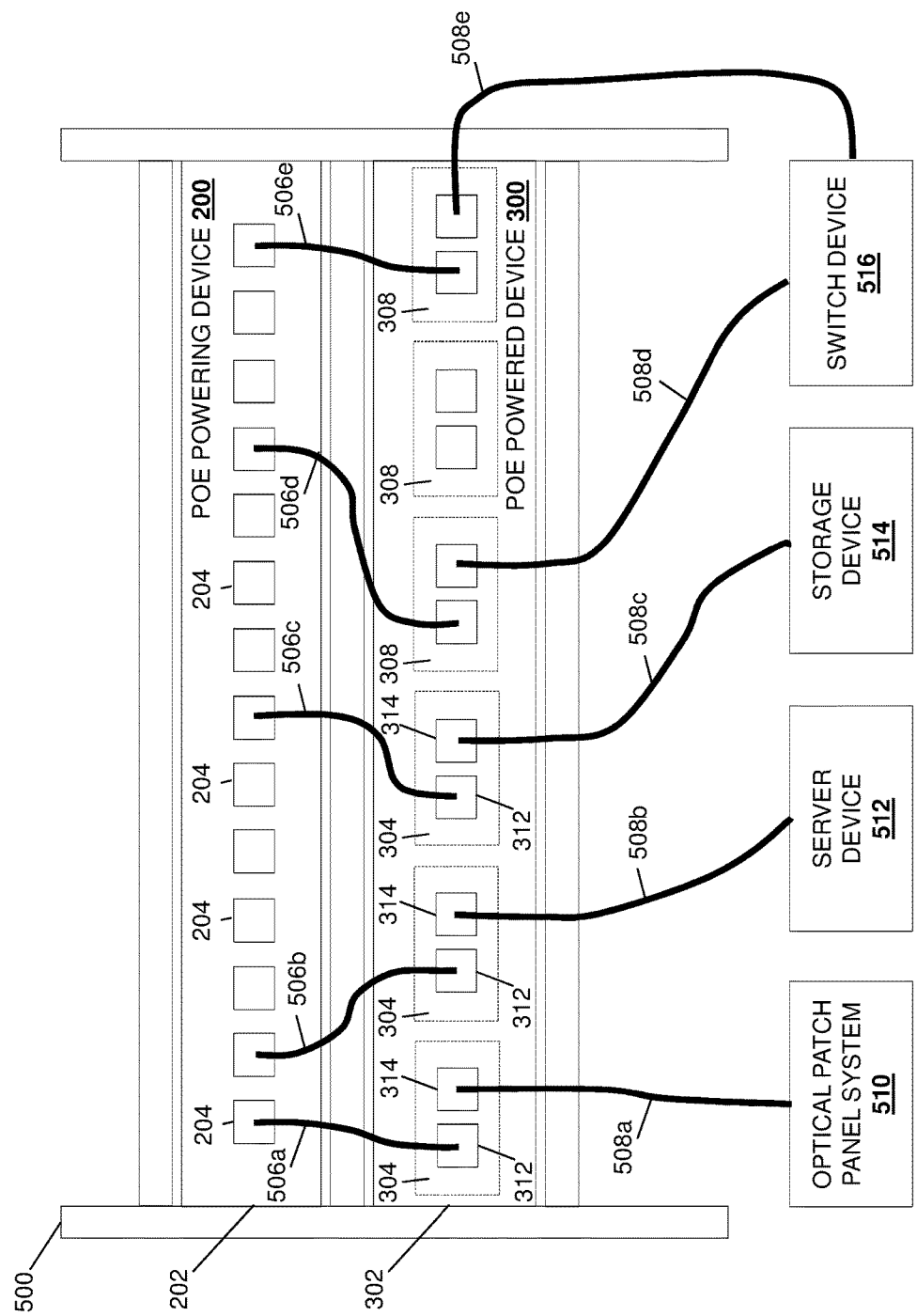
FIG. 5D is a front view illustrating an embodiment of PoE-powered data signal conversion subsystems in the PoE powered device of FIGS. 3A and 3B coupled to optical signal devices.

Referring now to FIG. 5D, the optical data ports 314 on the PoE-powered data signal conversion subsystems 304 that are included on the PoE powered device 300, and that are part of the Ethernet-electrical/Ethernet-optical data signal conversion subsystems 304 and 308 that have electrical data ports 312 connected to the PoE powering device 200, may then be connected to optical signal devices. For example, an Ethernet-optical SFP cable 508a may be provided to connect an Ethernet-optical SFP port 314 in an Ethernet-electrical/Ethernet-optical data signal conversion subsystem 304 on the PoE powered device 300 to an optical patch panel system 510; an Ethernet-optical SFP cable 508b may be provided to connect an Ethernet-optical SFP port 314 in an Ethernet-electrical/Ethernet-optical data signal conversion subsystem 304 on the PoE powered device 300 to a server device 512; an Ethernet-optical SFP cable 508c may be provided to connect an Ethernet-optical SFP port 314 in an Ethernet-electrical/Ethernet-optical data signal conversion subsystem 304 on the PoE powered device 300 to a storage device 514; and each of an Ethernet-optical SFP cable 508d and an Ethernet optical cable 508e may be provided to connect respective Ethernet-optical SFP ports 314 in Ethernet-electrical/Ethernet-optical data signal conversion subsystems 304 on the PoE powered device 300 to a switch device 516. While a specific example of the connections of the PoE powering device 200 to the PoE powered device 300, as well as the connections of the PoE powered device 300 to optical signal devices 510-516, has been described, one of skill in the art in possession of the present disclosure will recognize that a wide variety of other connection configurations will fall within the scope of the present disclosure as well.

In an specific example of block 402, the PoE powering engine 206 in the PoE powering device 200 may operate to transmit power and Ethernet-electrical data signals via any of its Ethernet-electrical Base-T RJ45 data ports 204 that are PoE-enabled, which causes that power and those Ethernet-electrical data signals to be transmitted over the respective Ethernet-electrical Base-T RJ45 cables (e.g., 506a-e) coupled to those Ethernet-electrical Base-T RJ45 data ports 204. In an embodiment, the provisioning of power by the PoE powering engine 206 via the PoE-enabled Ethernet-electrical Base-T RJ45 data ports 204 may be based on the classification process performed with their connected PoE-enabled Ethernet-electrical Base-T RJ45 data ports 312, discussed above. In addition, at block 402 the PoE powering engine 206 in the PoE powering device 200 may operate to transmit only Ethernet-electrical data signals (and not power) via any of its Ethernet-electrical Base-T RJ45 data ports 204 that are not PoE-enabled, which causes those Ethernet-electrical data signals to be transmitted over the respective Ethernet-electrical Base-T RJ45 cables (e.g., 506a-e) coupled to those Ethernet-electrical Base-T RJ45 data ports 204. One of skill in the art in possession of the present disclosure will recognize that the Ethernet-electrical data signals transmitted by the PoE powering engine 206 via the Ethernet-electrical Base-T RJ45 data ports 204 may be generated by the PoE powering device 200 (e.g., when the PoE powering device 200 is a server device), received through a network (e.g., when the PoE powering device 200 is a switch device), and/or may include a variety of Ethernet-electrical data signals generated and/or received by the PoE powering device in a variety of manners known in the art.

As such, at block 402, the Ethernet-electrical Base-T RJ45 data ports 312 in the Ethernet-electrical/Ethernet-optical data signal conversion subsystems 304 and the Ethernet-electrical/Ethernet-optical data signal conversion subsystems 308 that are PoE-enabled may receive power and Ethernet-electrical data signals via the respective Ethernet-electrical Base-T RJ45 cables 506a-e coupled to those Ethernet-electrical Base-T RJ45 data ports 312. In addition, at block 402, the Ethernet-electrical Base-T RJ45 data ports 312 in the Ethernet-electrical/Ethernet-optical data signal conversion subsystems 304 and the Ethernet-electrical/Ethernet-optical data signal conversion subsystems 308 that are not PoE enabled may receive only Ethernet-electrical data signals (and not power) via the respective Ethernet-electrical Base-T RJ45 cables 506a-e coupled to those Ethernet-electrical Base-T RJ45 data ports 312. As discussed below, the Ethernet-electrical Base-T RJ45 data ports 312 in the Ethernet-electrical/Ethernet-optical data signal conversion subsystems 304 and the Ethernet-electrical/Ethernet-optical data signal conversion subsystems 308 that are PoE-enabled may be configured to be classified at a relatively high power-receiving level in order to ensure that an amount of power is received at the PoE powered device 300 that is sufficient to power the Ethernet-electrical Base-T RJ45 data ports 312 in the Ethernet-electrical/Ethernet-optical data signal conversion subsystems 304 and the Ethernet-electrical/Ethernet-optical data signal conversion subsystems 308 that are not PoE-enabled.

The method 400 the proceeds to block 404 where the powered device electrical data port on the PoE powered device transmits the power to a power controller and transmits the electrical data signals to an electrical/optical signal converter. In an embodiment, at block 404, the power received at each Ethernet-electrical Base-T RJ45 data ports 312 in the Ethernet-electrical/Ethernet-optical data signal conversion subsystems 304 that is PoE-enabled is transmitted to the power controller 306, and the power received at each Ethernet-electrical Base-T RJ45 data ports 312 in the Ethernet-electrical/Ethernet-optical data signal conversion subsystems 308 that is PoE-enabled is transmitted to the power controller 310. As such, at block 404, the power controller 306 may be provided power from any of the Ethernet-electrical Base-T RJ45 data ports 312 in the Ethernet-electrical/Ethernet-optical data signal conversion subsystems 304 that is PoE-enabled and that received power from the PoE powering device 200 and block 402, and the power controller 310 may be provided power from any of the Ethernet-electrical Base-T RJ45 data ports 312 in the Ethernet-electrical/Ethernet-optical data signal conversion subsystems 308 that is PoE-enabled and that received power from the PoE powering device 200 and block 402. In addition, at block 402, the Ethernet-electrical data signals received at each Ethernet-electrical Base-T RJ45 data port 312 in the Ethernet-electrical/Ethernet-optical data signal conversion subsystems 304/308 is transmitted to the respective serializer/deserializer 316a in that Ethernet-electrical/Ethernet-optical data signal conversion subsystem 304/308.

The method 400 the proceeds to block 406 where an electrical/optical signal converter and a powered device optical port on the PoE powered device receive the power from the power controller that was provided by the powered device electrical data port(s) on the PoE powered device. In an embodiment, at block 406, the power controller 306 may transmit power received from any of the Ethernet-electrical Base-T RJ45 data ports 312 in the Ethernet-electrical/Ethernet-optical data signal conversion subsystems 304 to any of the serializer/deserializers 316a and the Ethernet-optical SFP data ports 314 in the Ethernet-electrical/Ethernet-optical data signal conversion subsystems 304. In one example, the power controller 306 may receive power via the Ethernet-electrical Base-T RJ45 data port 312 in the Ethernet-electrical/Ethernet-optical data signal conversion subsystem 304 through the Ethernet-electrical Base-T RJ45 cable 506a, and transmit that power to any of the serializer/deserializers 316a and Ethernet-electrical Base-T RJ45 data ports 312 in the Ethernet-electrical/Ethernet-optical data signal conversion subsystems 304 connected to that power converter 306. As such, the power controller 306 may distribute power received from one Ethernet-electrical Base-T RJ45 data port to any other serializer/deserializers and Ethernet-optical SFP data ports, which allows Ethernet-electrical/Ethernet-optical data signal conversion subsystems with Ethernet-electrical Base-T RJ45 data ports that are not PoE-enabled (i.e., that cannot receive power via their connected Electrical-electrical Base-T RJ45 cable) to be powered at block 408.

In some examples, the Ethernet-electrical Base-T RJ45 data port 312 in the Ethernet-electrical/Ethernet-optical data signal conversion subsystem 304 that received power through the Ethernet-electrical Base-T RJ45 cable 506a may provide at least a portion of that power to power the serializer/deserializer and Ethernet-optical SFP data port in that Ethernet-electrical/Ethernet-optical data signal conversion subsystem 304, while providing the remaining portion of that power to the power controller 306 as discussed above. As such, while not illustrated in detail in FIG. 3B, direct power couplings between the electrical data port 312 and each of the serializer/deserializer 316a and the optical data port 314 may be provided (in addition to, or in place of, the power couplings enabled by the power controller 306) to allow the Ethernet-electrical/Ethernet-optical data signal conversion subsystem 304 to power themselves using power received through their Ethernet-electrical Base-T RJ45 data ports 312.

However, in other examples, the power controller 306 may receive power via the Ethernet-electrical Base-T RJ45 data port 312 in the Ethernet-electrical/Ethernet-optical data signal conversion subsystem 304 through the Ethernet-electrical Base-T RJ45 cable 506a, and then transmit that power back to the serializer/deserializer 316a and the Ethernet-optical SFP data port 314 in that Ethernet-electrical/Ethernet-optical data signal conversion subsystems 304. As such, the power controller 306 may receive power from any of the Ethernet-electrical Base-T RJ45 data ports 312 in the Ethernet-electrical/Ethernet-optical data signal conversion subsystem 304, and then transmit at least some of that power back to the serializer/deserializer 316a and Ethernet-optical SFP data port 314 in that Ethernet-electrical/Ethernet-optical data signal conversion subsystem 304. This allows the power controller 306 to control the distribution of all the power received by the PoE-enabled Ethernet-electrical Base-T RJ45 data ports 312 in the Ethernet-electrical/Ethernet-optical data signal conversion subsystems 304, which allows power to be distributed to Ethernet-electrical/Ethernet-optical data signal conversion subsystems 304 based on priority (e.g., an Ethernet-electrical/Ethernet-optical data signal conversion subsystem 304 may receive power via its Ethernet-electrical Base-T RJ45 data port 312 and transmit that power to the power controller 306, but may not be powered because it is connected to optical signal devices that are of relatively lower priority than those connected to the other Ethernet-electrical/Ethernet-optical data signal conversion subsystems 304.)

While several specific examples of the operation of the power controller 306 and the Ethernet-electrical/Ethernet-optical data signal conversion subsystems 304 have been described, one of skill in the art in possession of the present disclosure will recognize that the power controller 310 and the Ethernet-electrical/Ethernet-optical data signal conversion subsystems 308 (as well as other power controllers and Ethernet-electrical/Ethernet-optical data signal conversion subsystems in the PoE powered device 300) may operate in a substantially similar manner as discussed above. In experimental embodiments, it was found that Ethernet-electrical/Ethernet-optical data signal conversion subsystem power consumption (approximately 5 watts) and PoE-enabled Ethernet-electrical Base-T RJ45 data port power availability (approximately 15 watts) called for a power controller for every three Ethernet-electrical/Ethernet-optical data signal conversion subsystems to ensure that only one of the Ethernet-electrical Base-T RJ45 data ports in those Ethernet-electrical/Ethernet-optical data signal conversion subsystems needed to receive power to sufficiently power all of the Ethernet-electrical/Ethernet-optical data signal conversion subsystems. However, one of skill in the art in possession of the present disclosure will recognize that this configuration may change based on system design choices, different system assumptions, power conversion power consumption and port power availability changes (e.g., via the use of PoE+ or UPoE), and/or other factors. As such, removal of the power controllers such that each Ethernet-electrical/Ethernet-optical data signal conversion subsystem powers itself via power received from its Ethernet-electrical Base-T RJ45 data port, or the provisioning of a power controller for more than three Ethernet-electrical/Ethernet-optical data signal conversion subsystems (e.g., up to sixteen with maximum UPoE power received via one electrical data port in experimental embodiments), will fall within the scope of the present disclosure as well.

The method 400 the proceeds to block 408 where the electrical/optical signal converter converts the electrical data signals to electrical optical signals and transmits the optical data signals to the powered device optical power on the PoE powered device. In an embodiment, at block 408, each serializer/deserializer 316a in the Ethernet-electrical/Ethernet-optical data signal conversion subsystem 304/308 that received Ethernet-electrical data signals at block 404 operates to convert those Ethernet-electrical data signals to Ethernet-optical data signals using the power received from the power controllers 306 and 310. For example, at block 408, each serializer/deserializer 316a may be powered by the power received from the power controllers 306 and 310, and may operate to convert the analog data signal received in the Ethernet-electrical data signal at block 404 into a digital serial optical data signal. Following the conversion of the Ethernet-electrical analog data signals to Ethernet-optical digital serial data signals, each serializer/deserializer 316a in the Ethernet-electrical/Ethernet-optical data signal conversion subsystem 304/308 provides those Ethernet-optical data signals to the Ethernet-optical data port 314 in that Ethernet-electrical/Ethernet-optical data signal conversion subsystem 304/308.

The method 400 then proceeds to block 410 where the powered device optical port on the PoE powered device transmits the optical data signals received from the electrical/optical signal converter to an optical signal device. In an embodiment, at block 410, each Ethernet-optical SFP data port 314 in the Ethernet-electrical/Ethernet-optical data signal conversion subsystems 304 that received the Ethernet-optical data signals from the serializer/deserializer 316a at block 406 operates to use the power received from the power controller 306 at block 406 to transmit those Ethernet-optical data signals to a connected optical signal device. For example, Ethernet-optical data signals may be transmitted over the Ethernet-optical SFP cable 508a to the optical path panel system 510 by the Ethernet-optical SFP data port 314 in the Ethernet-electrical/Ethernet-optical data signal conversion subsystem 304 using power received from the power controller 306 to power the optical data port components 314a-d; Ethernet-optical data signals may be transmitted over the Ethernet-optical SFP cable 508b to the server device 512 by the Ethernet-optical SFP data port 314 in the Ethernet-electrical/Ethernet-optical data signal conversion subsystem 304 using power received from the power controller 306 to power the optical data port components 314a-d; Ethernet-optical data signals may be transmitted over the Ethernet-optical SFP cable 508c to the storage device by the Ethernet-optical SFP data port 314 in the Ethernet-electrical/Ethernet-optical data signal conversion subsystem 304 using power received from the power controller 306 to power the optical data port components 314a-d; and Ethernet-optical data signals may be transmitted over the Ethernet-optical SFP cables 508d and 508e to the switch device 516 by the Ethernet-optical SFP data ports 314 in the Ethernet-electrical/Ethernet-optical data signal conversion subsystems 308 using power received from the power controller 310 to power the optical data port components 314a-d.

While not described herein in detail, one of skill in the art in possession of the present disclosure will recognize that the Ethernet-electrical/Ethernet-optical data signal conversion subsystems 304/308 in the PoE powered device 300 may operate to receive Ethernet-optical data signals (e.g., from the optical signal devices 510-516), convert those Ethernet-optical data signals to Ethernet-electrical data signals (similarly as discussed above for the conversion of Ethernet-electrical data signals to Ethernet-optical data signals), and provide those Ethernet electrical data signals to the PoE powering device 200 for use (i.e., in cases where the PoE powering device is a server device) or transmission (e.g., in cases where the PoE powering device is a switch device). In a specific example, the Ethernet-optical SFP data port 314 in the Ethernet-electrical/Ethernet-optical data signal conversion subsystem 304 may operate using power received from the power controller 306 to receive Ethernet-optical data signals through the Ethernet-optical SFP data cable 508a from the optical patch panel system 510, and transmit those Ethernet-optical data signals to the serializer/deserializer 316a. The serializer/deserializer 316a may then operate using power received from the power controller 306 to convert the Ethernet-optical data signals to Ethernet-electrical data signals by converting digital optical data signals to analog data signals, and sending those Ethernet-electrical data signals to the Ethernet-electrical Base-T RJ45 data port 312. Those Ethernet-electrical data signals are then transmitted via the Ethernet-electrical Base-T RJ45 data port 312 through the Ethernet-electrical Base-T RJ45 cable 506a to the Ethernet-electrical Base-T RJ45 data port 204 on the PoE powering device 200.

Figure 6:
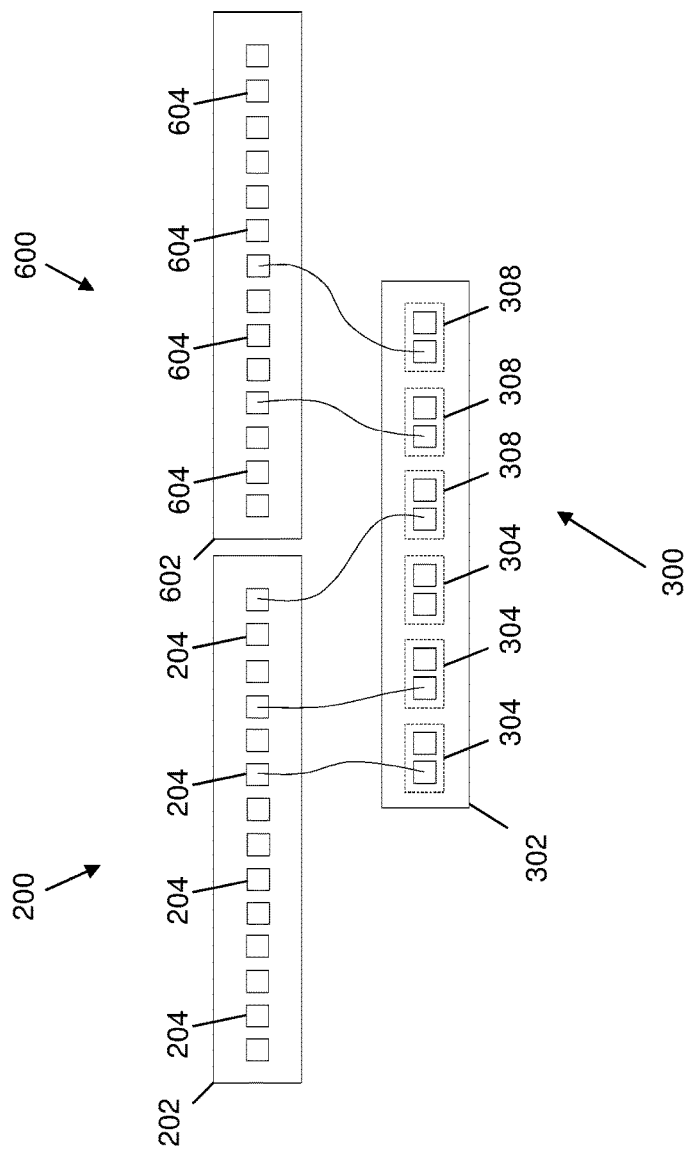
FIG. 6 is a front view illustrating an embodiment of the PoE powering device of FIG. 2 and a non-PoE-enabled switch device each coupled to the PoE powered device of FIGS. 3A and 3B.

Referring now to FIG. 6, an embodiment is illustrated in which the PoE powered device 300 is connected to the PoE powering device 200, and connected to a switch device 600 that may be POE-enabled or non-POE-enabled. In the embodiments discussed below, the switch device 600 is a non-POE-enabled switch device 600 including a chassis 602 having a plurality of non-PoE enabled electrical data ports 604. Specifically, in the illustrated embodiment, a first subset of the electrical data ports 312 in the electrical/optical data signal conversion subsystems 304/308 on the PoE powered device 300 are coupled to electrical data ports 204 on the PoE powering device 200 that are PoE-enabled, and a second subset of the electrical data ports 312 in the electrical/optical data signal conversion subsystems 308 on the PoE powered device 300 are coupled to electrical data ports 604 on the non-PoE-enabled switch device 600 that are not PoE-enabled. One of skill in the art in possession of the present disclosure will recognize how the connection of the electrical data port 312 in the electrical/optical data signal conversion subsystem 308 on the PoE powering device 300 to the PoE-enabled electrical data port 204 on the PoE powering device 200 provides power that is sufficient to allow for the operations of the electrical/optical data signal conversion subsystems 308 on the PoE powering device 300 that are connected to the non-PoE-enabled electrical data ports 604 on the non-PoE-enabled switch device 600. As such, the electrical/optical signal conversion discussed above may be provided for signals provided by non-PoE-enabled devices as long as a PoE-enabled device is available to provide power to the PoE powered device 300.

Figure 7:
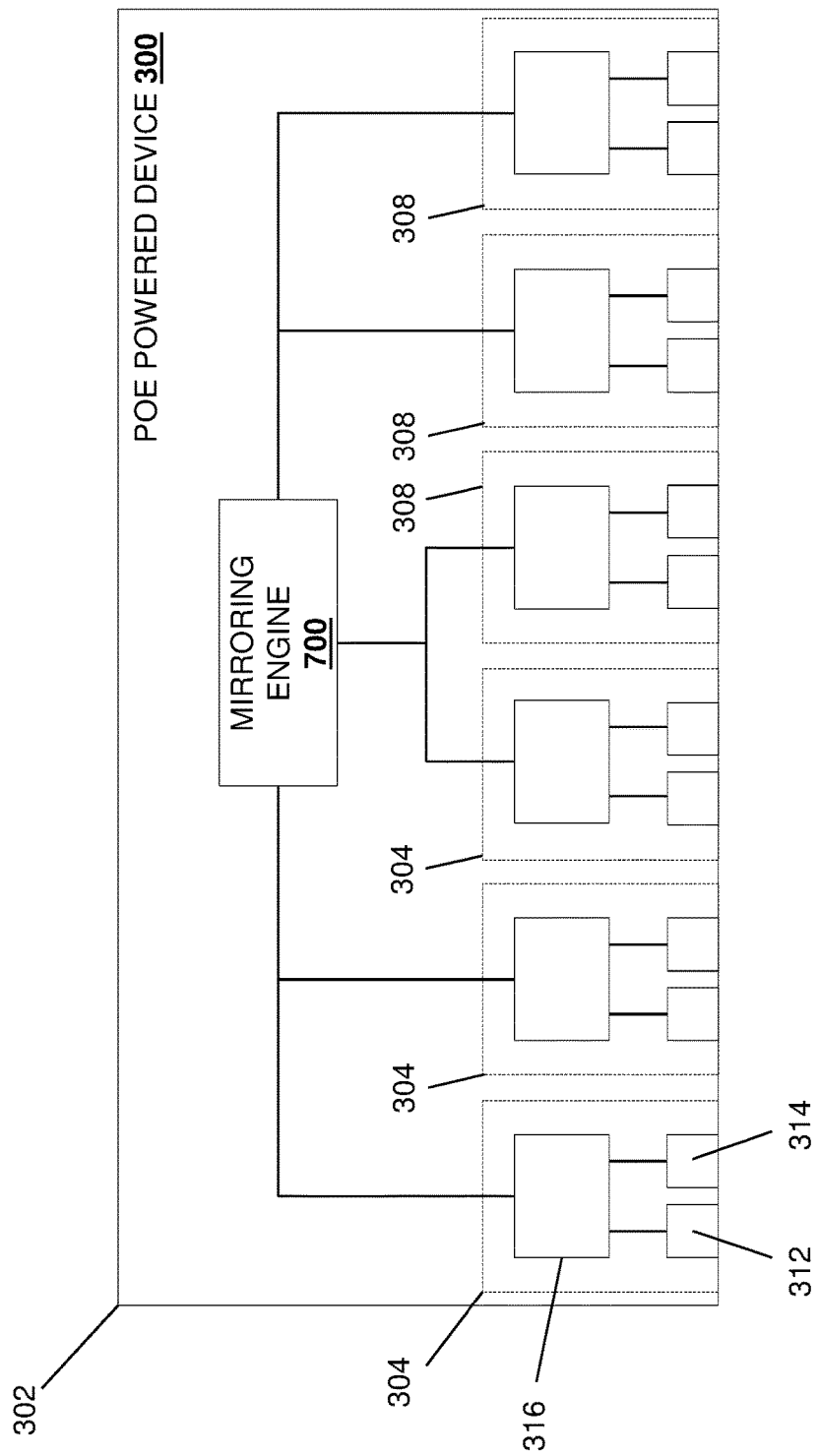
FIG. 7 is a schematic view illustrating an embodiment of the PoE powered device of FIGS. 3A and 3B provisioned with a mirroring engine for mirroring data received at a PoE-powered data signal conversion subsystem.

Referring now to FIG. 7, an embodiment of the PoE powered device 300 is illustrated including a mirroring engine 700 that may be provided by a processing system in the PoE powered device 300 (not illustrated, but which may include the processor 102 discussed above with reference to FIG. 1) that is coupled to a memory system in the PoE powered device 300 (not illustrated, but which may include the system memory 114 discussed above with reference to FIG. 1) that includes instructions that, when executed by the processing system, cause the processing system to provide the mirroring engine functionality discussed below. In the illustrated embodiment, the mirroring engine 700 may be coupled to any plurality of the electrical/optical data signal conversion subsystems 308 (e.g., via the coupling of the processing system to that electrical/optical data signal conversion subsystem.) While not illustrated in FIG. 7 for clarity, the PoE powered device 300 may also include the power controllers 306 and 310 illustrated in FIG. 3. In operation, the mirroring engine 700 may be configured to provide for port mirroring between a first Ethernet-electrical data port and/or a first Ethernet-optical data port in a first Ethernet-electrical/Ethernet-optical data signal conversion subsystem, and a second Ethernet-electrical data port and/or a second Ethernet-optical data port in a second Ethernet-electrical/Ethernet-optical data signal conversion subsystem.

For example, Ethernet-electrical data signals may be received at a first Ethernet-electrical data port in a first Ethernet-electrical/Ethernet-optical data signal conversion subsystem and transmitted to both the mirroring engine 700 and a first serializer/deserializer in the first Ethernet-electrical/Ethernet-optical data signal conversion subsystem. The mirroring engine 700 may then transmit those Ethernet-electrical data signals to a second serializer/deserializer in a second Ethernet-electrical/Ethernet-optical data signal conversion subsystem so that the second serializer/deserializer may convert those Ethernet-electrical data signals to Ethernet-optical data signals for transmission out of a second Ethernet-optical data port in the second Ethernet-electrical/Ethernet-optical data signal conversion subsystem. As such, while the Ethernet-electrical data signals are converted to Ethernet-optical data signals by the first serializer/deserializer in the first Ethernet-electrical/Ethernet-optical data signal conversion subsystem for transmission out of the first Ethernet-optical data port in the first Ethernet-electrical/Ethernet-optical data signal conversion subsystem, those Ethernet-optical data signals may be mirrored via their transmission out of the second Ethernet-optical data port in the second Ethernet-electrical/Ethernet-optical data signal conversion subsystem (e.g., to a analyzer device.)

In another example, Ethernet-electrical data signals may be received at a first Ethernet-electrical data port in a first Ethernet-electrical/Ethernet-optical data signal conversion subsystem and transmitted to the first serializer/deserializer in the first Ethernet-electrical/Ethernet-optical data signal conversion subsystem such that they are converted to Ethernet-optical data signals as discussed above. Those Ethernet-optical data signals may then be transmitted to both the mirroring engine 700 and the first Ethernet-optical data port in the first Ethernet-electrical/Ethernet-optical data signal conversion subsystem. The mirroring engine 700 may then transmit those Ethernet-optical data signals to a second Ethernet-optical data port in a second Ethernet-electrical/Ethernet-optical data signal conversion subsystem. As such, while the Ethernet-optical data signals are transmitted out of the first Ethernet-optical data port in the first Ethernet-electrical/Ethernet-optical data signal conversion subsystem, those Ethernet-optical data signals may be mirrored via their transmission out of the second Ethernet-optical data port in the second Ethernet-electrical/Ethernet-optical data signal conversion subsystem (e.g., to a analyzer device.)

Thus, systems and methods have been described that provide a powered PoE device that powers electrical/optical signal conversion subsystems via PoE power received at electrical data ports. The electrical/optical signal conversion subsystems may include an electrical/optical converter that is powered via the PoE power and that converts electrical data signals received at an electrical data port on that electrical/optical signal conversion subsystem to optical data signals that are then transmitted through an optical data port on that electrical/optical signal conversion subsystem that is also powered via the PoE power. The electrical/optical converter that is powered via the PoE power also converts optical data signals received at the optical data port on that electrical/optical signal conversion subsystem to electrical data signals that are then transmitted through the electrical data port on that electrical/optical signal conversion subsystem. When only subsets of the electrical/optical signal conversion subsystems include an electrical data port that receives PoE power that is utilized by the PoE device, the PoE power received via the electrical data ports on those electrical/optical signal conversion subsystems may be utilized to power electrical/optical signal conversion subsystems that include electrical data port that do not receive PoE power. As such, the ability to connect devices that communicate via electrical data signals to devices that communicate via optical data signals is greatly enhanced by simply using conventional cabling to connect those devices to the electrical/optical signal conversion subsystems, thus eliminating the issues associated with adjacent port blocking and the need for power adapters discussed above Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An Ethernet-electrical/Ethernet-optical signal conversion system, comprising:
   a Power over Ethernet (PoE) powering device that includes a plurality of powering device Ethernet-electrical data ports; and
   a PoE powered device that includes:
   a power controller; and
   a plurality of PoE-powered signal conversion subsystems that are each coupled to the power controller, wherein a first PoE-powered signal conversion subsystem of the plurality of PoE-powered signal conversion subsystems includes:
   a first electrical/optical signal converter;
   a first powered device Ethernet-electrical data port that is coupled to the first electrical/optical signal converter and connected to a first powering device Ethernet-electrical data port of the plurality of powering device Ethernet-electrical data ports on the PoE powering device, wherein the first powered device Ethernet-electrical data port is configured to:
   receive first Ethernet-electrical data signals transmitted by the first powering device Ethernet-electrical data port and transmit the first Ethernet-electrical data signals to the first electrical/optical signal converter; and
   receive power transmitted by the first powering device Ethernet-electrical data port and provide the power to the power controller; and
   a first powered device Ethernet-optical data port that is coupled to the first electrical/optical signal converter and connected to a first optical signal device, wherein the first powered device Ethernet-optical data port is configured to:
   receive power from the power controller that was provided by the first powered device Ethernet-electrical data port;
   receive first Ethernet-optical data signals from the first electrical/optical signal converter that were converted by the first electrical/optical signal converter from the first Ethernet-electrical data signals transmitted by the first powered device Ethernet-electrical data port; and
   transmit the first Ethernet-optical data signals to the first optical signal device.

2. The system of claim 1, wherein a second PoE-powered signal conversion subsystem of the plurality of PoE-powered signal conversion subsystems includes:
   a second electrical/optical signal converter; and
   a second powered device Ethernet-electrical data port that is coupled to the second electrical/optical signal converter and connected to a second powering device Ethernet-electrical data port of the plurality of powering device Ethernet-electrical data ports on the PoE powering device, wherein the second powered device Ethernet-electrical data port is configured to:
   receive second Ethernet-electrical data signals transmitted by the second powering device Ethernet-electrical data port and transmit the second Ethernet-electrical data signals to the second electrical/optical signal converter;
   a second powered device Ethernet-optical data port that is coupled to the second electrical/optical signal converter and connected to a second optical signal device, wherein the second powered device Ethernet-optical data port is configured to:
   receive power from the power controller that was provided by the first powered device Ethernet-electrical data port;
   receive second Ethernet-optical data signals from the second electrical/optical signal converter that were converted by the second electrical/optical signal converter from the second Ethernet-electrical data signals transmitted by the second powered device Ethernet-electrical data port; and
   transmit the second Ethernet-optical data signals to the second optical signal device.

3. The system of claim 2, wherein the second powering device Ethernet-electrical data port on the PoE powering device is a non-PoE enabled port that is not configured to transmit power.

4. The system of claim 1, wherein the first electrical/optical signal converter includes a serializer/deserializer device.

5. The system of claim 1, wherein the PoE powered device includes:
   a chassis that houses the power controller and the plurality of PoE-powered signal conversion subsystems, wherein the chassis is configured to be coupled to a rack that includes the PoE powering device.

6. The system of claim 1, wherein the PoE powered device includes:
   a mirroring engine that is coupled to the first PoE-powered signal conversion subsystem, wherein the mirroring engine is configured to:
   mirror the first Ethernet-optical data signals to a second powered device Ethernet-optical data port included in a second PoE-powered signal conversion subsystem of the plurality of PoE-powered signal conversion subsystems in the PoE powered device.

7. An Information Handling System (IHS), comprising:
   a power controller; and
   a first Power over Ethernet (PoE)-powered signal conversion subsystem including:
   a first electrical/optical signal converter;
   a first powered device Ethernet-electrical data port that is coupled to the first electrical/optical signal converter and that is configured to:
   receive first Ethernet-electrical data signals transmitted by a first powering device Ethernet-electrical data port on a PoE powering device and transmit the first Ethernet-electrical data signals to the first electrical/optical signal converter; and
   receive power transmitted by the first powering device Ethernet-electrical data port on the PoE powering device and provide the power to the power controller; and
   a first powered device Ethernet-optical data port that is coupled to the first electrical/optical signal converter and that is configured to:
   receive power from the power controller that was provided by the first powered device Ethernet-electrical data port;
   receive first Ethernet-optical data signals from the first electrical/optical signal converter that were converted by the first electrical/optical signal converter from the first Ethernet-electrical data signals transmitted by the first powered device Ethernet-electrical data port; and transmit the first Ethernet-optical data signals to a first optical signal device.

8. The IHS of claim 7, further comprising:
a second Power over Ethernet (PoE)-powered signal conversion subsystem including:
a second electrical/optical signal converter;
a second powered device Ethernet-electrical data port that is coupled to the second electrical/optical signal converter and that is configured to:
receive second Ethernet-electrical data signals transmitted by a second powering device Ethernet-electrical data port on the PoE powering device and transmit the second Ethernet-electrical data signals to the second electrical/optical signal converter; and
receive power transmitted by the second powering device Ethernet-electrical data port on the PoE powering device and provide the power to the power controller; and
a second powered device Ethernet-optical data port that is coupled to the second electrical/optical signal converter and that is configured to:
receive power from the power controller that was provided by the first powered device Ethernet-electrical data port;
receive second Ethernet-optical data signals from the second electrical/optical signal converter that were converted by the second electrical/optical signal converter from the second Ethernet-electrical data signals transmitted by the second powered device Ethernet-electrical data port; and
transmit the second Ethernet-optical data signals to a second optical signal device.

9. The IHS of claim 8, wherein the second powering device Ethernet-electrical data port on the PoE powering device is a non-PoE enabled port that is not configured to transmit power.

10. The IHS of claim 7, wherein the first electrical/optical signal converter includes a serializer/deserializer device.

11. The IHS of claim 7, further comprising:
a chassis that houses the power controller and the first PoE-powered signal conversion subsystem, wherein the chassis is configured to be coupled to a rack that includes the PoE powering device.

12. The IHS of claim 7, further comprising:
a second PoE-powered signal conversion subsystem; and
a mirroring engine that is coupled to the first PoE-powered signal conversion subsystem and the second PoE-powered signal conversion subsystem, wherein the mirroring engine is configured to:
mirror the first Ethernet-optical data signals to a second powered device Ethernet-optical data port included in the second PoE-powered signal conversion subsystem.

13. The IHS of claim 7, wherein the first powered device Ethernet-electrical data port is a copper base-T RJ45 port, and wherein the first powered device Ethernet-optical data port is an optical Small Form-factor Pluggable (SFP) port.

14. A method for providing PoE-powered Ethernet-electrical to Ethernet-optical signal conversion, comprising:
receiving, by a first powered device Ethernet-electrical data port on a PoE powered device, first Ethernet-electrical data signals transmitted by a first powering device Ethernet-electrical data port on a PoE powering device;
receiving, by the first powered device Ethernet-electrical data port on the PoE powered device, power transmitted by the first powering device Ethernet-electrical data port on the PoE powering device;
providing, by the first powered device Ethernet-electrical data port on the PoE powered device, the power to a power controller in the PoE powered device;
transmitting, by the first powered device Ethernet-electrical data port on the PoE powered device, the first Ethernet-electrical data signals to a first electrical/optical signal converter in the PoE powered device;
converting, by the first electrical/optical signal converter in the PoE powered device, the first Ethernet-electrical data signals to first Ethernet-optical data signals;
transmitting, by the first electrical/optical signal converter in the PoE powered device, the first Ethernet-optical data signals to a first powered device Ethernet-optical data port on the PoE powered device;
receiving, by the first powered device Ethernet-optical data port on the PoE powered device, power from the power controller that was provided by the first powered device Ethernet-electrical data port; and
transmitting, by the first powered device Ethernet-optical data port on the PoE powered device, the first Ethernet-optical data signals to a first optical signal device.

15. The method of claim 14, further comprising:
receiving, by a second powered device Ethernet-electrical data port on the PoE powered device, second Ethernet-electrical data signals transmitted by a second powering device Ethernet-electrical data port on the PoE powering device;
transmitting, by the second powered device Ethernet-electrical data port on the PoE powered device, the second Ethernet-electrical data signals to a second electrical/optical signal converter in the PoE powered device;
converting, by the second electrical/optical signal converter in the PoE powered device, the second Ethernet-electrical data signals to second Ethernet-optical data signals;
transmitting, by the second electrical/optical signal converter in the PoE powered device, the second Ethernet-optical data signals to a second powered device Ethernet-optical data port on the PoE powered device;
receiving, by the second powered device Ethernet-optical data port on the PoE powered device, power from the power controller that was provided by the first powered device Ethernet-electrical data port; and
transmitting, by the second powered device Ethernet-optical data port on the PoE powered device, the second Ethernet-optical data signals to a second optical signal device.

16. The method of claim 15, wherein the second powering device Ethernet-electrical data port on the PoE powering device is a non-PoE enabled port that is not configured to transmit power.

17. The method of claim 14, wherein the first electrical/optical signal converter includes a serializer/deserializer device.

18. The method of claim 14, wherein the PoE powered device includes a chassis, and wherein the method further comprises:
coupling the chassis to a rack that includes the PoE powering device.

19. The method of claim 14 further comprising:
mirroring, by a mirroring engine in the PoE powered device, the first Ethernet-optical data signals to a second powered device Ethernet-optical data port on the PoE powered device.

20. The method of claim 14, wherein the first powered device Ethernet-electrical data port is a copper base-T RJ45 port, and wherein the first powered device Ethernet-optical data port is an optical Small Form-factor Pluggable (SFP) port.

* * * * *